United States Patent
Hayford et al.

(10) Patent No.: US 9,611,909 B2
(45) Date of Patent: Apr. 4, 2017

(54) BRAKE ASSEMBLY HAVING A CAMSHAFT SEAL ASSEMBLY

(71) Applicant: ArvinMeritor Technology, LLC, Troy, MI (US)

(72) Inventors: Roy Hayford, Northville, MI (US); Kenneth Pietila, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 295 days.

(21) Appl. No.: 14/465,074

(22) Filed: Aug. 21, 2014

(65) Prior Publication Data

US 2016/0053840 A1 Feb. 25, 2016

(51) Int. Cl.
| | |
|---|---|
| F16D 65/22 | (2006.01) |
| F16J 15/32 | (2016.01) |
| F16J 15/3208 | (2016.01) |
| F16J 15/3268 | (2016.01) |
| F16J 15/3252 | (2016.01) |
| F16D 125/30 | (2012.01) |

(52) U.S. Cl.
CPC .......... *F16D 65/22* (2013.01); *F16J 15/3208* (2013.01); *F16J 15/3252* (2013.01); *F16J 15/3268* (2013.01); *F16D 2125/30* (2013.01)

(58) Field of Classification Search
CPC ...... F16D 65/22; F16D 65/14; F16D 2125/30; F16D 2125/28; F16D 2121/14; F16J 15/3208; F16J 15/3252; F16J 15/3268; F16H 53/00; F01L 1/047; F01L 2001/34436; F16C 33/78; F16C 33/7816; F16C 33/782; F16C 33/7823; F16C 33/7826; F16C 33/7883
See application file for complete search history.

(56) References Cited

U.S. PATENT DOCUMENTS

| | | | |
|---|---|---|---|
| 5,947,070 A * | 9/1999 | Immel | F01L 1/047 123/90.37 |
| 6,213,264 B1 | 4/2001 | Walker et al. | |
| 6,378,658 B1 | 4/2002 | Kay | |
| 6,550,780 B1 | 4/2003 | DeLeeuw et al. | |
| 9,291,223 B2 * | 3/2016 | Varela | F16D 65/0062 |
| 2006/0021834 A1 * | 2/2006 | Kwasniewski | F16D 51/20 188/329 |
| 2008/0261704 A1 * | 10/2008 | Drouin | B60T 11/04 464/7 |

* cited by examiner

*Primary Examiner* — Adam D Rogers
(74) *Attorney, Agent, or Firm* — Brooks Kushman P.C.

(57) ABSTRACT

A brake assembly having a seal assembly that extends around a camshaft tube. The seal assembly may have a first retainer ring, a second retainer ring, and a seal. The seal may extend between the first retainer ring and the second retainer ring and the camshaft tube may be disposed between the camshaft and the seal.

20 Claims, 4 Drawing Sheets

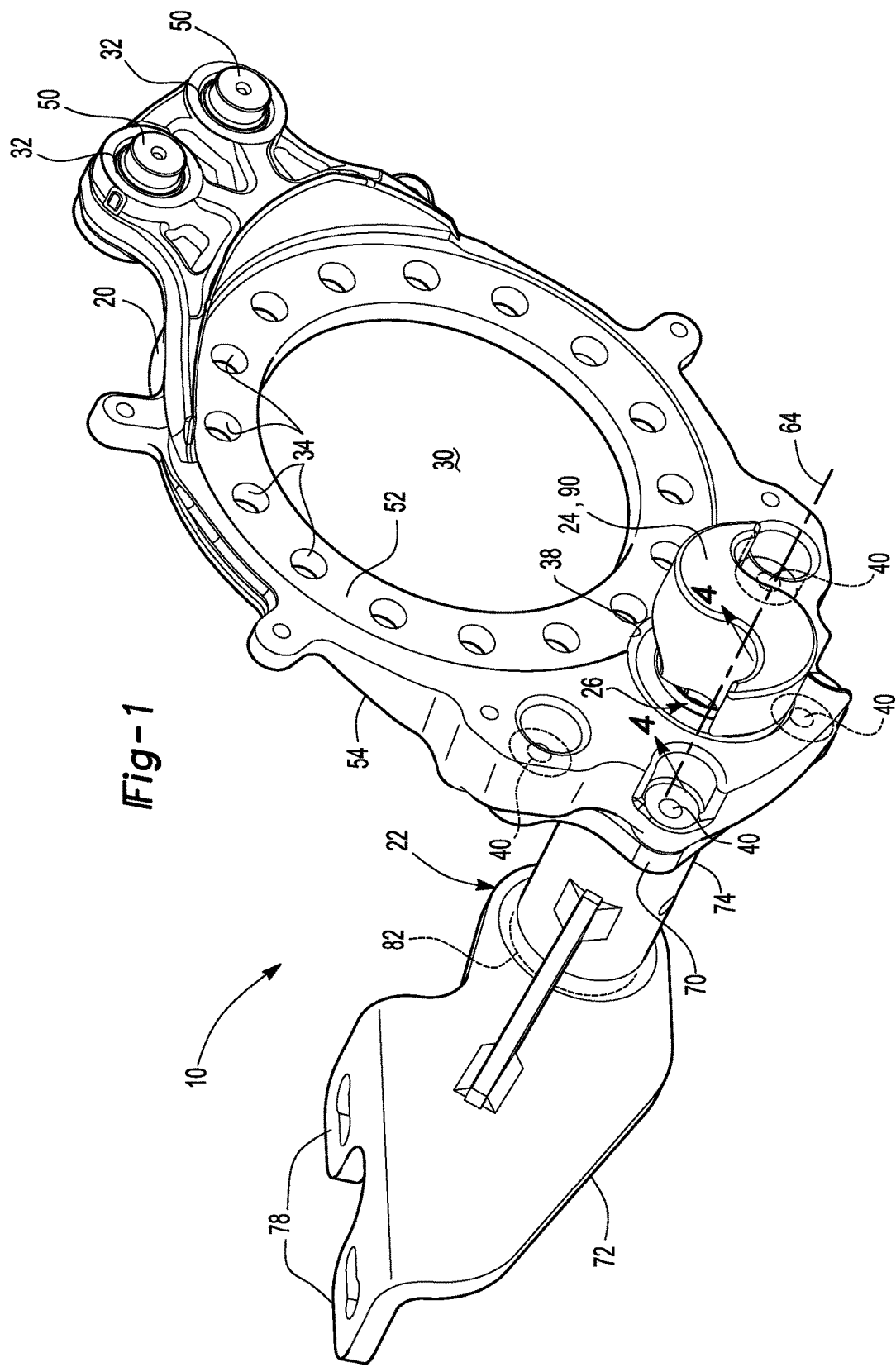

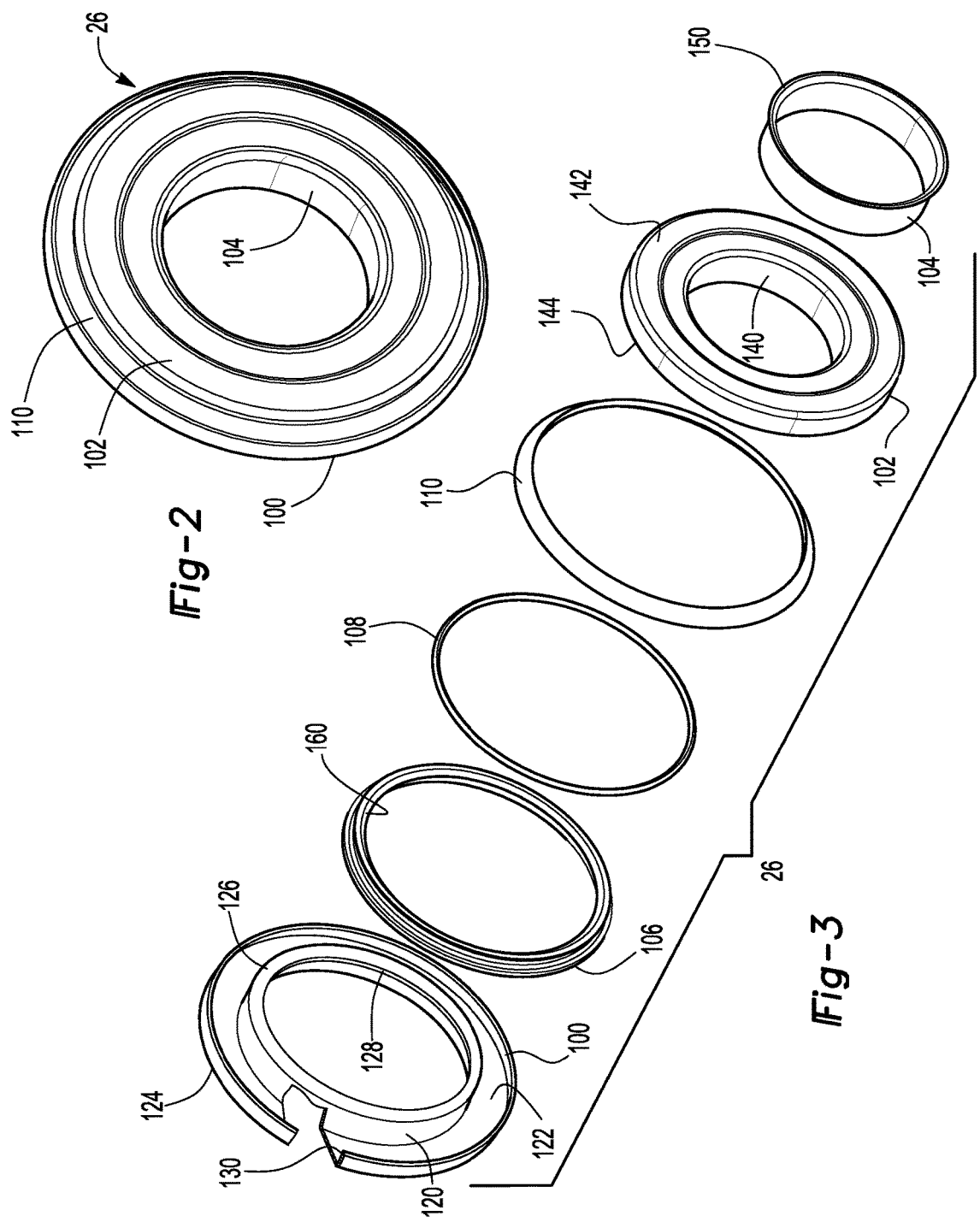

BRAKE ASSEMBLY HAVING A CAMSHAFT SEAL ASSEMBLY

TECHNICAL FIELD

This patent application relates to a brake assembly having a seal assembly that may at least partially extend around a camshaft tube.

BACKGROUND

A sealing arrangement for a brake camshaft is disclosed in U.S. Pat. No. 6,213,264.

SUMMARY

In at least one embodiment, a brake assembly is provided. The brake assembly may include a camshaft tube, a camshaft, and a seal assembly. The camshaft tube may have a hole that may receive the camshaft. The seal assembly may have a first retainer ring and a second retainer ring. The first retainer ring may be fixedly positioned with respect to the camshaft tube. The second retainer ring may be fixedly positioned with respect to the camshaft. The seal may extend from the first retainer ring to the second retainer ring. The seal may extend around the camshaft tube such that the camshaft tube may be disposed between the camshaft and the seal.

In at least one embodiment, a brake assembly is provided. The brake assembly may include a spider, a camshaft tube, a camshaft, and a seal assembly. The spider may facilitate mounting of the brake assembly. The camshaft tube may be fixedly mounted to the spider. The camshaft may extend through a hole in the camshaft tube. The seal assembly may include a first retainer ring, a second retainer ring, a seal, and a biasing member. The first retainer ring may be mounted on the camshaft tube and may be fixedly positioned with respect to the camshaft tube and the spider. The second retainer ring may be mounted on the camshaft. The seal may extend around the camshaft tube and may engage the first retainer ring and the second retainer ring. The biasing member may bias the seal to sealingly engage the second retainer ring.

BRIEF DESCRIPTION OF THE DRAWINGS

FIG. 1 is a perspective view of an exemplary brake assembly having a seal assembly.

FIG. 2 is a perspective view of the seal assembly.

FIG. 3 is an exploded view of the seal assembly.

DETAILED DESCRIPTION

Figure 4:
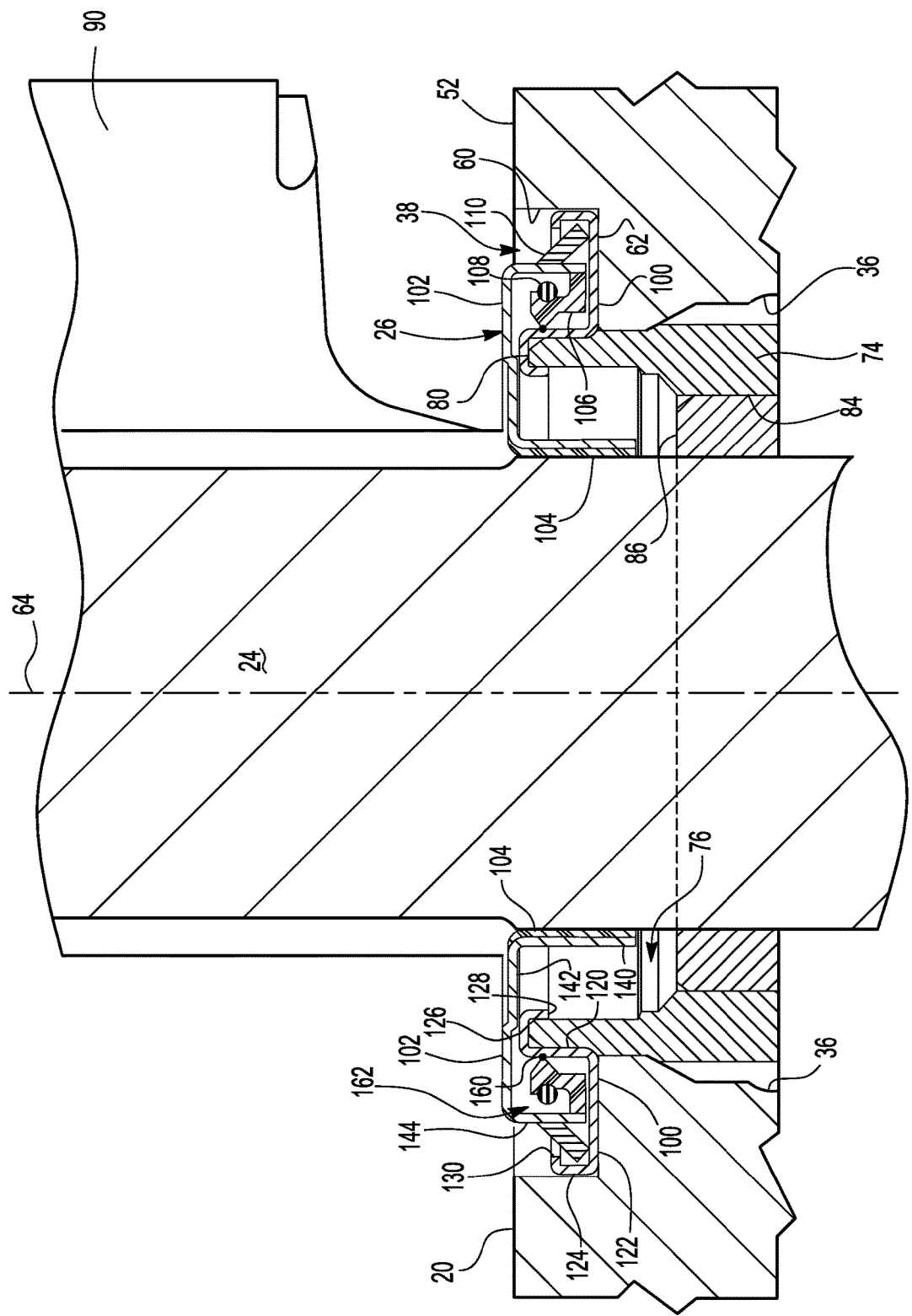
FIG. 4 is a section view of the seal assembly along section line 4-4.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a portion of an exemplary brake assembly 10 is shown. The brake assembly 10 may be provided with a vehicle, such as a motor vehicle like a truck, bus, farm equipment, mining equipment, military transport or weaponry vehicle, or cargo loading equipment for land, air, or marine vessels. In addition, the brake assembly 10 may be provided on a trailer that may be coupled to or may be provided with a motor vehicle.

The brake assembly 10 may be a friction brake that may be configured to slow or inhibit rotation of at least one associated wheel. In FIG. 1, the brake assembly 10 is depicted as a drum brake. In a drum brake configuration, a brake drum may extend continuously around brake pad assemblies that may be configured to engage the brake drum to slow the rotation of a wheel. The brake drum may be disposed between a wheel and a wheel hub assembly that may rotatably support the wheel. In at least one embodiment, the brake assembly 10 may include a spider 20, a bracket assembly 22, a camshaft 24, and a seal assembly 26.

Referring to FIGS. 1 and 4, the spider 20 may support various components of the brake assembly 10. In addition, the spider 20 may facilitate mounting of the brake assembly 10 to the vehicle. For example, the spider 20 may be fixedly disposed on or fixedly disposed with respect to an axle assembly or a steering knuckle. In at least one embodiment, the spider 20 may include a main opening 30 through which an axle and/or a spindle may extend. For example, a spindle may extend through the main opening 30 and may support one or more wheel bearings that may support and facilitate rotation of a wheel assembly. The spider 20 may also include at least one anchor pin hole 32, at least one spider mounting hole 34, a camshaft opening 36, a seal mounting portion 38, and a bracket assembly mounting hole 40.

The anchor pin hole 32 may receive an anchor pin 50 that may facilitate mounting and operation of a brake pad assembly will be discussed in more detail below. In the embodiment shown, two anchor pin holes 32 are provided that are generally disposed opposite the bracket assembly 22. Each anchor pin hole 32 may receive a different anchor pin 50, which in turn may support different brake pad assemblies. The anchor pin 50 may be fixedly disposed in the anchor pin hole 32 such that the anchor pin 50 does not rotate with respect to the spider 20. It is also contemplated that the anchor pin hole 32 may be omitted in one or more embodiments.

A spider mounting hole 34 may facilitate mounting of the spider 20 to the vehicle. In FIG. 1, a plurality of spider mounting holes 34 are arranged around the main opening 30. Each spider mounting hole 34 may receive a fastener, such as a bolt, that may extend through the spider mounting hole 34 and couple the spider 20 to another component, such as an axle assembly or a steering knuckle. The spider mounting holes 34 may be omitted in one or more embodiments, such as in a configuration where the spider 20 is attached to or integrally formed with a vehicle component like an axle assembly or a steering knuckle.

The camshaft opening 36, which is best shown in FIG. 4, may receive the camshaft 24. The camshaft 24 may extend through the camshaft opening 36 to engage one or more brake pad assemblies.

Referring to FIG. 4, the seal mounting portion 38 may extend around the camshaft opening 36 and may facilitate mounting of the seal assembly 26. For example, the seal mounting portion 38 may extend from a first surface 52 of the spider 20 toward the bracket assembly 22 or toward a second surface 54, which is best shown in FIG. 1, that may be disposed opposite the first surface 52. In at least one embodiment, the seal mounting portion 38 may be configured as a groove or recess in the spider 20. The seal mounting portion 38 may have a first seal mounting portion surface 60 and a second seal mounting portion surface 62.

The first seal mounting portion surface 60 may extend from the first surface 52 toward the second surface 54. In addition, the first seal mounting portion surface 60 may be radially disposed with respect to an axis 64 about which the camshaft 24 may rotate. It is also contemplated that the first seal mounting portion surface 60 may be omitted in one or more embodiments.

The second seal mounting portion surface 62 may extend from the first seal mounting portion surface 60 to the camshaft opening 36. In addition, the second seal mounting portion surface 62 may be disposed substantially perpendicular to the axis 64 in one or more embodiments. The second seal mounting portion surface 62 may be disposed between the first surface 52 and the second surface 54. In addition, the second seal mounting portion surface 62 may extend substantially parallel to an adjacent region of the first surface 52.

Referring again to FIG. 1, one or more bracket assembly mounting holes 40 may extend at least partially through the spider 20. The bracket assembly mounting holes 40 may facilitate mounting of the bracket assembly 22 to the spider 20 as will be discussed in more detail below. The bracket assembly mounting holes 40 may extend from the second surface 54 to or toward the first surface 52. It is also contemplated that the bracket assembly mounting holes 40 may be omitted in one or more embodiments, such as when the bracket assembly 22 is attached in a different manner, such as with an adhesive, press fit, welding, or the like.

The bracket assembly 22 may facilitate coupling of the camshaft 24 to the spider 20. In at least one embodiment, the bracket assembly 22 may include a mounting flange 70, a brake wing 72, and a camshaft tube 74. In at least one embodiment, the mounting flange 70, brake wing 72, and camshaft tube 74 may be provided as separate components. It is also contemplated that the mounting flange 70 may be integrally formed with the camshaft tube 74 or the brake wing 72 may be integrally formed with the camshaft tube 74, thereby resulting in a two piece bracket assembly configuration, or the camshaft tube 74 may be integral with the mounting flange 70 and the brake wing 72. In addition, the bracket assembly 22 may have a hole 76, which is best shown in FIG. 4, that may receive the camshaft 24. The hole 76 may be a through hole that may extend through the bracket assembly 22. The hole 76 may extend along the axis 64 and may be defined by hole portions in the mounting flange 70, the brake wing 72, and the camshaft tube 74 as will be discussed in more detail below.

The mounting flange 70 and the brake wing 72 may be disposed proximate opposite ends of the camshaft tube 74. The mounting flange 70 and the brake wing 72 may be fixedly coupled to the camshaft tube 74 in any suitable manner. For example, the mounting flange 70 and brake wing 72 may be fixedly coupled to the camshaft tube 74 by welding, an adhesive, interference fit, or with one or more fasteners. In addition, the mounting flange 70 and the brake wing 72 may overlap each other in a male/female relationship in one or more embodiments. For example, the mounting flange 70 and/or the brake wing 72 may have a male configuration and a corresponding portion of the camshaft tube 74 may have a female configuration, or vice versa. The mounting flange 70 may also be omitted in one or more embodiments, such as when the camshaft tube 74 is attached to another component, such as the spider 20.

The mounting flange 70 may facilitate mounting of the bracket assembly 22 to the spider 20. The mounting flange 70 may be spaced apart from the brake wing 72 and may be fixedly coupled to the camshaft tube 74. The mounting flange 70 may define a portion of the hole 76 through which the camshaft 24 may extend. In addition, the mounting flange 70 may include a mounting hole that may be aligned with a corresponding bracket assembly mounting hole 40 on the spider 20. The mounting hole may receive a fastener that may couple the mounting flange 70 to the spider 20.

The brake wing 72 may be coupled to the camshaft tube 74, an axle assembly, or a steering knuckle. The brake wing 72 may be spaced apart from the spider 20 and may be fixedly coupled to the camshaft tube 74 opposite the mounting flange 70. The brake wing 72 may define a portion of the hole 76 through which the camshaft 24 may extend. The brake wing 72 may also include a flange portion 78 that may support an actuator that may be provided to rotate the camshaft 24 about the axis 64. The actuator may be fixedly mounted on the brake wing 72 and may be configured to engage a slack adjuster that may be mounted to an end of the camshaft 24 that may be disposed near the brake wing 72. The slack adjuster may compensate for brake wear or wear of the friction material of a brake pad assembly. The actuator may be of any suitable type, such as a pneumatic, hydraulic, electrical, or electromechanical actuator. The actuator may move between a retracted position and an extended position. In the retracted position, the camshaft 24 may be positioned such that a brake pad assembly does not engage the brake drum to brake or inhibit rotation of an associated vehicle wheel assembly. In the extended position, the actuator may rotate the camshaft 24 and actuate the brake pad assemblies to move toward and engage the brake drum to inhibit rotation of an associated wheel hub assembly.

Referring to FIGS. 1 and 4, the camshaft tube 74 may extend from the mounting flange 70 to the brake wing 72. The camshaft tube 74 may have a generally tubular configuration and may define a portion of the hole 76 through which the camshaft 24 may extend. In at least one embodiment, the camshaft tube 74 may have a first end 80, a second end 82, and an inner tube surface 84.

The first end 80, which is best shown in FIG. 4, may extend into the camshaft opening 36 of the spider 20. The first end 80 may be disposed proximate the seal assembly 26 and the first surface 52 in one or more embodiments.

The second end 82, which is best shown in FIG. 1, may be disposed opposite the first end 80. The second end 82 may be disposed proximate or may be received in a hole in the brake wing 72.

The inner tube surface 84, which is best shown in FIG. 4, may extend from the first end 80 to the second end 82 and may at least partially define the hole 76. For example, the inner tube surface 84 may include a circumferential surface that may be radially disposed about the axis 64 and that may face toward and may be spaced apart from the camshaft 24.

The hole 76 of the camshaft tube 74 may receive various components in addition to the camshaft 24. For example, the hole 76 may receive a bearing or bushing 86 that may extend around the camshaft 24 to rotatably support the camshaft 24. In addition, the hole 76 may receive a lubricant, such as grease, that may help lubricate the bearing or bushing.

The camshaft 24 may extend along and may rotate about the axis 64. The camshaft 24 may extend through camshaft opening 36 in the spider 20 and the hole 76 in the bracket assembly 22. The camshaft 24 may include a cam 90 disposed at a first end. The cam 90 may be configured as an S-cam that may be configured to actuate multiple brake pad assemblies when the camshaft 24 is rotated. The camshaft 24 may also include a second end that may be disposed opposite the first end. The second end of the camshaft 24 may be disposed proximate or may be coupled to the slack adjuster.

The camshaft 24 may be configured to actuate one or more brake pad assemblies that may include a brake shoe and a friction material.

The brake shoe may be a structural member of a brake pad assembly. The brake shoe may be pivotally mounted to the spider 20 at a first end via the anchor pin 50. For example, the brake shoe may pivot about an outer surface or circumference of the anchor pin 50 when the brake pad assembly is actuated. An opposite end of the brake shoe may have a cam roller that may be configured to engage the camshaft 24.

The friction material, which may also be called a brake lining, may be disposed on an outer surface of the brake shoe and may face toward the brake drum. The friction material may engage the brake drum during vehicle braking and may be spaced apart from the brake drum when the friction braking is not being applied.

Rotation of the camshaft 24 may rotate the cam 90 about the axis 64. The cam 90 may engage the cam roller on the brake shoe. As such, rotation of the camshaft 24 may exert force on a brake shoe and cause an associated brake pad assembly to pivot about the anchor pin 50 and actuate the brake pad assembly such that the friction material moves toward or engages an inner surface of the brake drum to brake or slow or inhibit rotation of an associated wheel.

Figure 5:
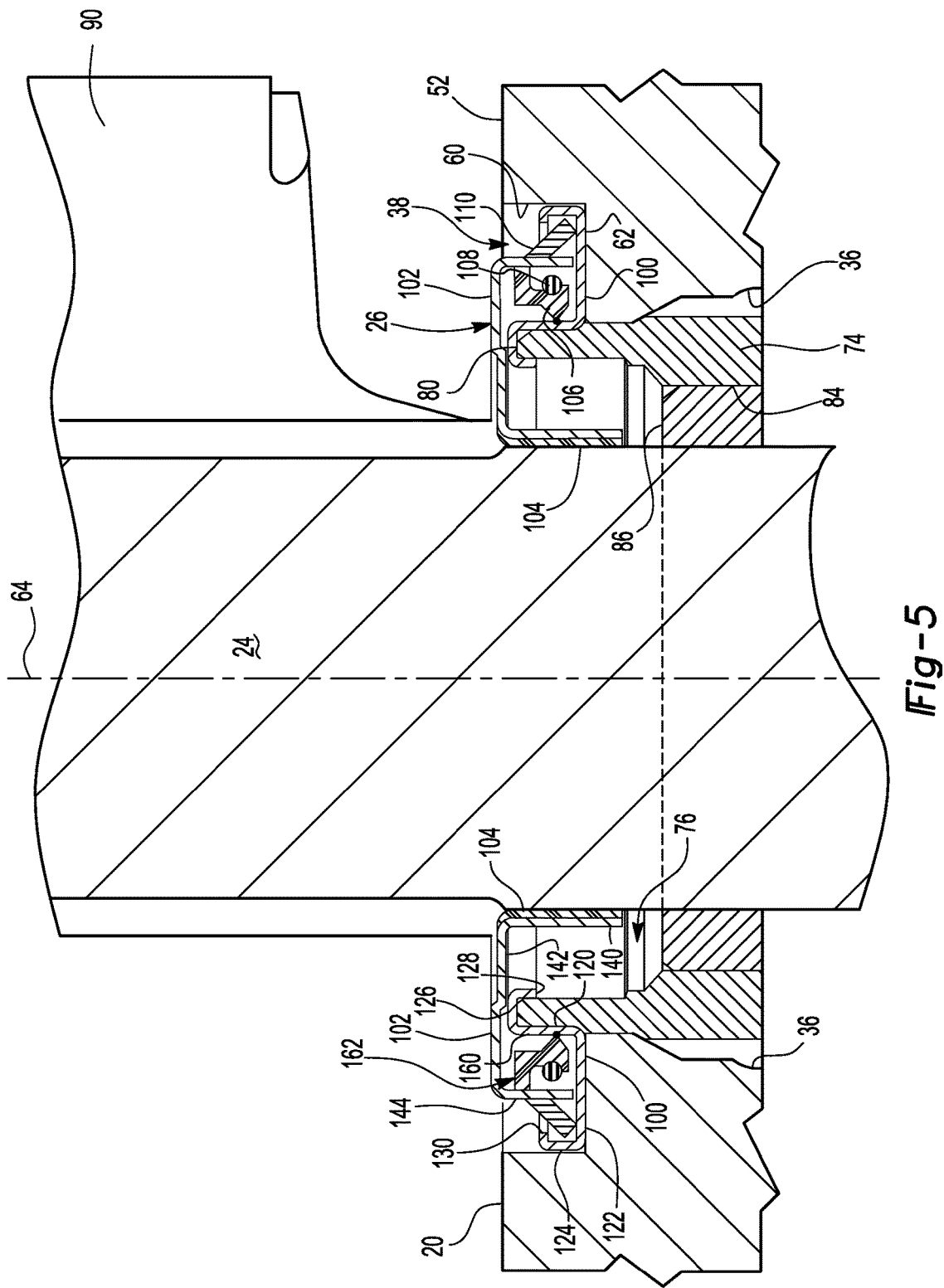
FIG. 5 is a section view of another embodiment of a seal assembly.

Referring to FIGS. 2-4, the seal assembly 26 is shown in more detail. The seal assembly 26 may help inhibit contaminants from entering the camshaft tube 74 and may help retain lubricant in the camshaft tube 74. In at least one embodiment, the seal assembly 26 may include a first retainer ring 100, a second retainer ring 102, a mounting ring 104, a seal 106, a biasing member 108, and a deflector 110. In FIGS. 4 and 5, the seal assembly 26 is shown near an end of the camshaft tube 74 that may be disposed proximate the cam 90, but it is contemplated that the seal assembly 26 may be disposed proximate an opposite end of the camshaft tube 74 or that one or more seal assemblies 26 may be disposed between opposite ends of the camshaft tube 74 and/or bracket assembly 22.

The first retainer ring 100 may facilitate mounting of the seal assembly 26 to a component of the brake assembly 10, such as the spider 20. The first retainer ring 100 may be fixedly positioned with respect to the spider 20 and/or the camshaft tube 74. For example, the first retainer ring 100 may be fixedly mounted to the spider 20 and/or the camshaft tube 74, such as by press fitting or by use of an adhesive or fastener. In addition, the first retainer ring 100 may be partially or completely disposed in the seal mounting portion 38 in the spider 20. The first retainer ring 100 may extend continuously around the axis 64. In at least one embodiment, the first retainer ring 100 may include a first wall 120, a second wall 122, a third wall 124, a fourth wall 126, and a fifth wall 128.

The first wall 120 may face toward and may be disposed proximate the camshaft tube 74. In at least one embodiment, the first wall 120 may extend around the camshaft tube 74 and engage the camshaft tube 74 such that the first retainer ring 100 is fixedly mounted to the camshaft tube 74. The first wall 120 may extend substantially parallel to the axis 64 and may extend toward the may be spaced apart from the bushing 86 and the second retainer ring 102.

The second wall 122 may extend from an end of the first wall 120 in a direction that extends away from the axis 64. The second wall 122 may be disposed proximate and may engage the second seal mounting portion surface 62.

The third wall 124 may extend from an end of the second wall 122 that may be disposed opposite the first wall 120. As such, the third wall 124 may be spaced apart from the first wall 120 and may be disposed opposite the first wall 120. The third wall 124 may be disposed proximate and may engage the first seal mounting portion surface 60. Moreover, the third wall 124 may be completely disposed in the seal mounting portion 38 such that the third wall 124 is disposed below the first surface 52 of the spider 20. In addition, at least a portion of the third wall 124 may extend substantially parallel to the axis 64. The third wall 124 may include an annular lip 130 that may extend toward the first wall 120. The annular lip 130 may also be spaced apart from and may extend substantially parallel to the second wall 122. The annular lip 130 may also be disposed in the seal mounting portion 38 such that the annular lip 130 is disposed below and spaced apart from the first surface 52.

The fourth wall 126, if provided, may be disposed proximate an end of the camshaft tube 74. The fourth wall 126 may extend the first wall 120 toward the camshaft 24 and may or may not be spaced apart from the second retainer ring 102.

The fifth wall 128, if provided, may be disposed between the camshaft 24 and the camshaft tube 74. The fifth wall 128 may extend from an end of the fourth wall 126 and may be disposed on an opposite side of the camshaft tube 74 from the first wall 120. The first wall 120 and/or the fifth wall 128 may engage the camshaft tube 74 to help secure the first retainer ring 100 to the camshaft tube 74. The fifth wall 128 or the fourth wall 126 and the fifth wall 128 may be omitted in one or more embodiments.

The second retainer ring 102 may facilitate mounting of the seal assembly 26 to another component of the brake assembly 10, such as the camshaft 24. The second retainer ring 102 may be fixedly positioned with respect to the camshaft 24. For example, second retainer ring 102 may be directly or indirectly mounted to the camshaft 24. In the embodiment shown, the second retainer ring 102 is indirectly mounted to the camshaft 24 by the mounting ring 104. As such, the second retainer ring 102 may rotate with the camshaft 24 about the axis 64 and may rotate with respect to the first retainer ring 100. The second retainer ring 102 may extend continuously around the camshaft 24 and the axis 64. In at least one embodiment, the second retainer ring 102 may include a first portion 140, a second portion 142, and a third portion 144.

The first portion 140 may be disposed proximate the camshaft. For example, the first portion 140 may face toward and may be disposed proximate an outer surface or outside circumference of the camshaft 24. As such, the first portion 140 may extend continuously around the camshaft 24 and/or the mounting ring 104. In addition, the first portion 140 may be fixedly mounted to the camshaft 24 and/or the mounting ring 104 in one or more embodiments. The first portion 140 may extend substantially parallel to the axis 64 and may extend away from the cam 90 of the camshaft 24. In addition, the first portion 140 may be disposed in the hole 76 of the camshaft tube 74 and may extend toward the second surface 54 of the spider 20.

The second portion 142 may extend from an end of the first portion 140 in a direction that extends away from the axis 64. As such, the second portion 142 may cover or conceal a portion of the first retainer ring 100, the seal 106, and the biasing member 108. The second portion 142 may be disposed substantially parallel to the second wall 122 in one or more embodiments. In addition, the second portion 142 may be generally aligned with the first surface 52 in one or more embodiments. The first wall 120 of the first retainer ring 100 may extend toward but may be spaced apart from the second portion 142 so as to not impede rotation of the camshaft 24. It is also contemplated that the first wall 120 may engage the second portion 142 in one or more embodiments, but in a manner that permits the camshaft 24 to rotate.

The third portion 144 may extend from an end of the second portion 142 that may be disposed opposite the first portion 140. As such, the third portion 144 may be spaced apart from the first portion 140. The third portion 144 may extend toward but may be spaced apart from the second wall 122 of the first retainer ring 100. In addition, the third portion 144 may extend substantially parallel to the axis 64. The third portion 144 may be disposed between the first wall 120 and the third wall 124 of the first retainer ring 100. As such, the third portion 144 may be at least partially disposed in the seal mounting portion 38.

The mounting ring 104 may be disposed proximate and may engage the camshaft 24. For example, the mounting ring 104 may be disposed in the hole 76 of the camshaft tube 74 and may extend away from the first surface 52 of the spider 20. In addition, the mounting ring 104 may be disposed between and may be fixedly positioned with respect to the camshaft 24 and the second retainer ring 102. In the embodiment shown in FIG. 4, the mounting ring 104 extends around an outer surface or outside circumference of the camshaft 24 and separates the second retainer ring 102 from the camshaft 24. The mounting ring 104 may be fixedly disposed on the camshaft 24 in any suitable manner, such as by press fitting or with an adhesive. The mounting ring 104 may include a mounting ring lip 150 that may extend away from the axis 64 and that may help inhibit axial movement of the second retainer ring 102.

The seal 106 may extend from the first retainer ring 100 to the second retainer ring 102. The seal 106 may engage the first retainer ring 100 and the second retainer ring 102 to help retain the lubricant in the camshaft tube 74 and to inhibit contaminants from getting past the seal and entering the hole in the camshaft tube 74. The seal 106 may be generally configured as a continuous ring that may extend around the axis 64. The seal 106 may be positioned such that the seal 106 extends around the camshaft tube 74 such that the camshaft tube 74 is disposed between the camshaft 24 and the seal 106. As such, the seal 106 may be disposed outside the camshaft tube 74 rather than inside the camshaft tube 74 and may not engage the camshaft 24. Moreover, the seal 106 may be completely disposed between the first retainer ring 100 and the second retainer ring 102 such that the seal 106 does not engage the camshaft tube 74.

The seal 106 may be fixedly positioned on or with respect to the second retainer ring 102. For example, the seal 106 may be attached to the second retainer ring 102 and any suitable manner, such as by overmolding or with a fastener or an adhesive. As shown in FIG. 4, the seal 106 may be coupled to the second retainer ring 102 proximate a distal end of the third portion 144. As shown in FIG. 5, the seal 106 may also be coupled to the second retainer ring 102 in other locations, such as proximate the second portion 142 and/or the third portion 144. It is also contemplated that the seal 106 may be coupled to the first retainer ring 100 and may extend toward the second retainer ring 102 in one or more embodiments. The seal 106 may be made of any suitable material, such as rubber, or a polymeric material. The seal 106 may also include a seal lip 160 that may sealingly engage the first retainer ring 100. For example, the seal lip 160 may extend toward and may engage the first wall 120 of the first retainer ring 100. The seal 106 may be completely disposed in the seal mounting portion 38 and may be disposed in a cavity 162 that may be generally bounded by the first wall 120 and the second wall 122 of the first retainer ring 100 and the second portion 142 and the third portion 144 of the second retainer ring 102.

The biasing member 108 may exert a biasing force on the seal 106. More specifically, the biasing member 108 may extend around the seal 106 and may bias the seal 106 toward the axis 64 and against the first wall 120 of the first retainer ring 100. The biasing member 108 may be configured as a ring that may extend continuously around the seal 106 and that may be disposed opposite the seal lip 160. As such, the biasing member 108 may bias the seal lip 160 against the first wall 120 to sealingly engage the first wall 120 of the retainer ring 100. It is also contemplated that the biasing member 108 may bias the seal 106 against the second retainer ring 102, such as when the seal 106 is coupled to the first retainer ring 100. In addition, the biasing member 108 may be disposed in the cavity 162 between the third portion 144 of the second retainer ring 102 and a surface of the seal 106 that may be disposed opposite the seal lip 160 in one or more embodiments. The biasing member 108 may also be disposed in the seal mounting portion 38 and may be disposed between and may be spaced apart from the second wall 122 of the first retainer ring 100 and the second portion 142 of the second retainer ring 102. As such, the biasing member 108 may be completely disposed between the first retainer ring 100 and the second retainer ring 102.

The deflector 110 may be provided to help shield at least a portion of the seal assembly 26 from environmental contaminants or inhibit environmental contaminants from reaching the seal 106. In at least one embodiment, the deflector 110 may be fixedly disposed on the second retainer ring 102 and may extend to the first retainer ring 100. For example, the deflector 110 may extend from the third portion 144 of the second retainer ring 102 or toward part of the first retainer ring 100, such as the second wall 122. The deflector 110 may be configured as a ring that may extend continuously around the second retainer ring 102. In addition, the deflector 110 may extend at an angle toward the first retainer ring 100 or toward the second wall 122. Moreover, the deflector 110 may be disposed opposite the seal 106, may be spaced apart from the annular lip 130, and may be completely disposed in the seal mounting portion 38 in one or more embodiments. The deflector 110 may be fixedly disposed on the second retainer ring 102 in any suitable manner, such as by press fitting, overmolding, or use of an adhesive or fasteners.

The seal assembly described above may permit a seal to be positioned outside of a camshaft tube and may utilize space outside of the camshaft tube rather than packaging a seal between an inside diameter of the camshaft tube and the camshaft. Such positioning may provide additional space for packaging the seal assembly and may also provide a more robust seal than design in which the seal is disposed inside the camshaft tube. For example, the seal assembly described above may allow the seal to be positioned such that the seal does not engage the camshaft. Such a configuration may inhibit or prevent damage to a seal lip that may occur during installation of the camshaft in a seal assembly design where a seal lip directly engages a camshaft. Moreover, the seal is contained within and may be protected by the retainer rings of the seal assembly, which may improve durability and seal service life. Moreover, the seal assembly may permit a seal to engage and seal against one or more sealing surfaces that may have improved surface finish as compared to a seal that is positioned inside a camshaft tube, which may further enhance seal life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a camshaft tube that has a hole;
   a camshaft that is received in the hole; and
   a seal assembly that includes:
      a first retainer ring that is fixedly positioned with respect to the camshaft tube;
      a second retainer ring that is fixedly positioned with respect to the camshaft; and
      a seal that extends from the first retainer ring to the second retainer ring, wherein at least a portion of the second retainer ring extends around the seal and the seal extends around the first retainer ring and the camshaft tube such that the camshaft tube is disposed between the camshaft and the seal.

2. The brake assembly of claim 1 wherein the second retainer ring rotates about an axis with respect to the first retainer ring.

3. The brake assembly of claim 1 further comprising a mounting ring that is disposed between and fixedly positioned with respect to the camshaft and the second retainer ring.

4. The brake assembly of claim 1 wherein the seal is fixedly positioned on the second retainer ring.

5. The brake assembly of claim 1 wherein the seal is completely disposed between the first retainer ring and the second retainer ring and does not engage the camshaft tube.

6. The brake assembly of claim 1 further comprising a biasing member that extends around the seal and biases the seal against the first retainer ring.

7. The brake assembly of claim 6 wherein the biasing member is completely disposed between the first retainer ring and the second retainer ring.

8. The brake assembly of claim 1 further comprising a deflector that extends between the first retainer ring and the second retainer ring.

9. The brake assembly of claim 8 wherein the deflector is disposed opposite the seal.

10. A brake assembly comprising:
    a spider that facilitates mounting of the brake assembly;
    a camshaft tube that has a hole and that is fixedly mounted to the spider;
    a camshaft that extends through the hole; and
    a seal assembly that includes:
       a first retainer ring that is mounted on the camshaft tube and fixedly positioned with respect to the camshaft tube and the spider;
       a second retainer ring that is mounted on the camshaft;
       a seal that extends around the camshaft tube and engages the first retainer ring and the second retainer ring; and
       a biasing member that biases the seal to sealingly engage the second retainer ring.

11. The brake assembly of claim 10 wherein the spider has a seal mounting portion that is disposed adjacent to the camshaft tube, wherein the first retainer ring is disposed in the seal mounting portion.

12. The brake assembly of claim 11 wherein the seal is disposed in the seal mounting portion.

13. The brake assembly of claim 11 wherein the first retainer ring, the second retainer ring, and the seal are disposed in the seal mounting portion such that the seal is disposed between the first retainer ring and the second retainer ring.

14. The brake assembly of claim 10 wherein the first retainer ring has a first wall that engages and extends around the camshaft tube, wherein the seal sealingly engages the first wall.

15. The brake assembly of claim 14 wherein the first retainer ring further comprises a second wall that extends from the first wall and a third wall that extends from the second wall, wherein the second wall is disposed proximate the spider and the seal is disposed between the first wall and the third wall.

16. The brake assembly of claim 10 wherein the second retainer ring has a first portion that is disposed proximate the camshaft, a second portion that extends from the first portion, and a third portion that extends from the second portion, wherein the seal extends from the third portion to the first retainer ring.

17. The brake assembly of claim 16 further comprising a deflector that extends between the first retainer ring and the second retainer ring.

18. The brake assembly of claim 16 wherein a first wall of the first retainer ring extends toward the second portion of the second retainer ring and the third portion of the second retainer ring extends toward a second wall of the first retainer ring.

19. The brake assembly of claim 10 wherein the first retainer ring is disposed proximate an end of the camshaft tube.

20. The brake assembly of claim 19 wherein at least a portion of the first retainer ring is disposed between the camshaft tube and the camshaft.

* * * * *